United States Patent [19]

Schmidt

[11] Patent Number: 4,823,819

[45] Date of Patent: Apr. 25, 1989

[54] APPARATUS FOR REMOVING RESIDUES FROM PARTS OF PLASTICS PROCESSING MACHINES

[75] Inventor: Rudolf Schmidt, Munich, Fed. Rep. of Germany

[73] Assignee: C. Christ Abgasfreie Werkzeugreinigungsapparate für die Kunststoffindustrie, Munich, Fed. Rep. of Germany

[21] Appl. No.: 180,244

[22] Filed: Apr. 11, 1988

[30] Foreign Application Priority Data

Apr. 14, 1987 [DE] Fed. Rep. of Germany ....... 3712640

[51] Int. Cl.⁴ .......................... B08B 3/12; B08B 15/02
[52] U.S. Cl. .................................. 134/104.4; 134/105; 134/110; 134/113; 134/192
[58] Field of Search .................. 134/5, 104, 105, 107, 134/109, 110, 113, 184, 192

[56] References Cited

U.S. PATENT DOCUMENTS

| 2,371,394 | 3/1945 | Hunter et al. | 134/105 X |
| 2,527,666 | 10/1950 | Winter | 134/105 X |
| 3,011,769 | 12/1961 | Umbricht | 134/104 X |

FOREIGN PATENT DOCUMENTS

| 3146478 | 7/1986 | Fed. Rep. of Germany . | |
| 273307 | 4/1928 | United Kingdom | 134/105 |

Primary Examiner—Philip R. Coe
Attorney, Agent, or Firm—Henry M. Feiereisen

[57] ABSTRACT

An apparatus for removing plastic residues from parts of plastics processing machines includes a vessel which is closed in air tight manner by an end plate and contains heat transfer fluid. Immersing within the heat transfer fluid is a disk which is operatively connected to a vibrator so as to oscillate for improving the cleaning action. Placed on the end plate is a tubular casing box which is divided into a lower compartment which is essentially sealed off and in which the vibrator is accommodated and into an upper compartment which is open to the atmosphere. At least one pipe traverses the lower compartment for connecting the interior of the vessel with the upper compartment so that vapor and gases may escape through this pipe. A filter is arranged within the upper compartment for absorbing the vapor and gases to prevent the release of obnoxious gases.

13 Claims, 2 Drawing Sheets

APPARATUS FOR REMOVING RESIDUES FROM PARTS OF PLASTICS PROCESSING MACHINES

BACKGROUND OF THE INVENTION

The present invention is related to an apparatus for removing residues, in particular plastic residues, from parts of plastics processing machines.

A cleaning apparatus of this type is disclosed in the German patent DE-PS No. 31 46 478 and includes a treatment vessel which contains a heat transfer fluid and cooperates with a heating unit. The parts to be cleaned are inserted into the vessel with the fluid heated up to a temperature above the melting point of the adhering plastic residues to be removed. Attached to the container is an electromagnetic vibration exciter which oscillates a disk immersed in the heat transfer fluid.

Since the vessel is sealed off in airtight manner, safety concerns require the cleaning apparatus of this type to be equipped with a pressure control valve which i.e. is responsive when the fluid level of the heat transfer fluid within the vessel is too low so that during heating the pressure of the thus entrapped large air volume exceeds a given limiting value. The pressure control valve is also responsive when the temperature is set to a value above the temperature of decomposition of the respective plastic material. In each case, an actuation of the pressure control valve releases undesired vapor or gases into the atmosphere which may be harmful or at least result in obnoxious odor. Further, in case that materials other than the parts to be cleaned are unintentionally introduced into the vessel the presence of obnoxious gases is encountered when these materials decompose during the heating action. Finally, the vessel may be unintentionally filled with an excessive quantity of heat transfer fluid up to its upper rim so that during the heating step, a certain amount of heat transfer fluid is released via the safety valve into the environment. This, however, leads again at least to obnoxious odor.

SUMMARY OF THE INVENTION

It is thus an object of the present invention to provide an improved apparatus for removing residues from parts of plastics processing machines obviating the afore-stated drawbacks.

This object and others which will become apparent hereinafter are attained in accordance with the present invention by placing on the vessel a casing box which is divided in an essentially closed lower compartment and an upper compartment open toward the outside, and includes at least one pipe connecting the interior of the vessel with the upper compartment for allowing gases to escape to the upper compartment and to be absorbed by a filter extending in the upper compartment.

Preferably, the lower compartment accommodates a compressed-air vibrator which oscillates a disk immersed in the heat transfer fluid for improving the cleaning action. A vibrator of this type is powerful and considerably reduces the cleaning period in comparison to electromagnetic vibrators.

The provision of a casing box in accordance with the present invention prevents the occurrence of excess pressure build up within the vessel and the release of obnoxious gases into the atmosphere. By incorporating the vibrator within the lower compartment, its exhaust air may be utilized to cool and condense the gases escaping through the pipe so that the thus obtained liquid can then easily be disposed of or collected by e.g. using a drain tube entering the upper compartment at the bottom of the upper compartment and extending to a collecting receptacle. Thus, the disposal of even greater amounts of liquid is ensured from the upper compartment.

According to a further feature of the invention, the exhaust air generated by the vibrator is discharged through an exhaust pipe traversing the filter. Thus, the considerable amount of exhaust air of the vibrator is kept away from the filter which thus may be dimensioned solely for absorbing the gases and vapor escaping from the interior of the vessel. Preferably, the filter includes a filter basket with porous gas-permeable bottom slab and a packing of activated carbon.

According to a further feature of the present invention, the level of heat transfer fluid within the vessel is limited by an overflow pipe which enters the vessel at a suitable location thereof and is connected to a tank located within the collecting receptacle.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
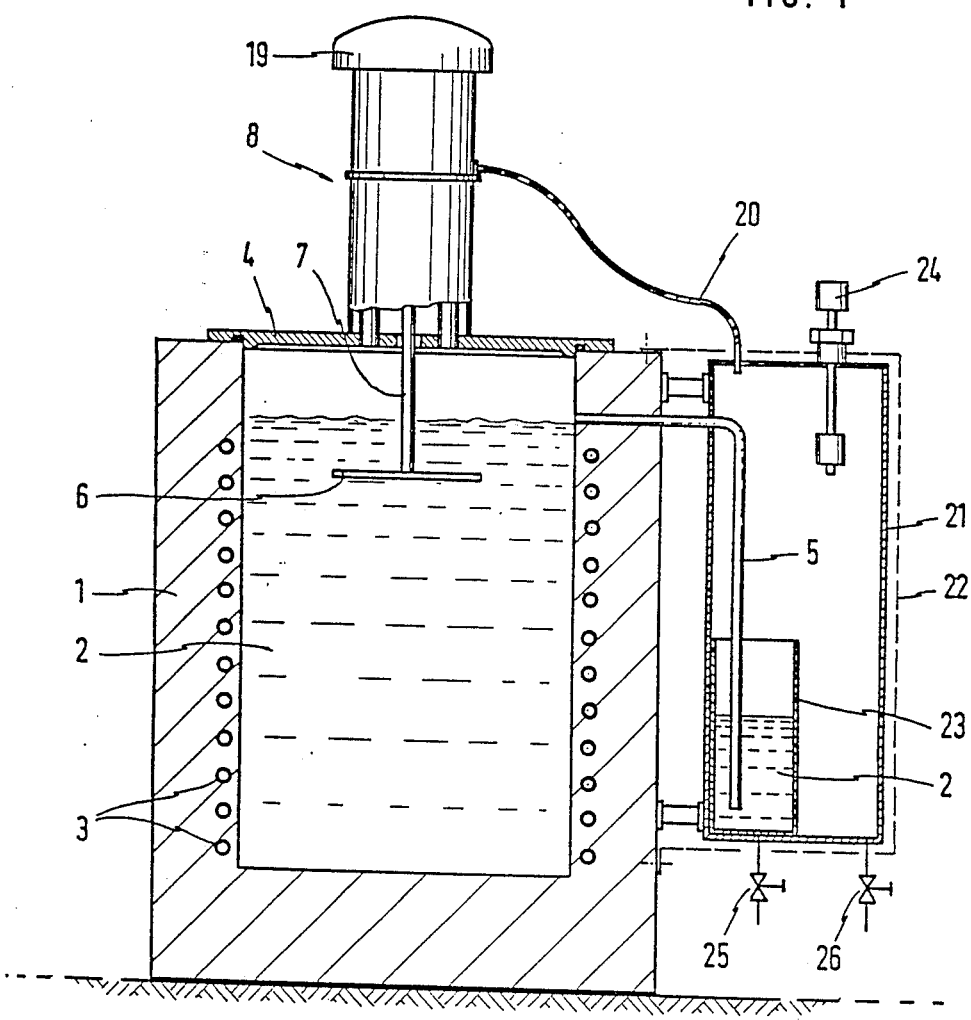
FIG. 1 is a schematically simplified longitudinal section of one embodiment of a cleaning apparatus in accordance with the present invention.

Referring now to the nonlimiting example as illustrated in the drawing, and in particular to FIG. 1 there is shown a longitudinal section of one embodiment of an apparatus for removing residues of plastic material from parts of plastics processing machines. The cleaning apparatus includes a vessel 1 in which the parts of plastics processing machines, such as extruder screws, extruder heads or the like coated with adhering plastic residues are introduced through its upper open end and then treated. The vessel 1 contains a liquid heat transfer fluid 2 which can be heated to a predetermined temperature of up to about 400° C. by an electric heating unit 3 which is illustrated only schematically for ease of illustration.

The temperature of the heat transfer fluid should not essentially exceed the melting temperature of the plastic residues adhering to the parts so as to avoid a decomposition which could result in undesired gaseous products. After being removed from the parts, the plastic residues float upwards and accumulate on the surface of the heat transfer fluid.

The upper open end of the vessel 1 is closable by an end plate or lid 4 in airtight manner via suitable seals 4a. At a suitable location, the vessel 1 is provided with an overflow or drain pipe 5 so as to restrict the filling level of the heat transfer fluid 2 within the vessel 1. Preferably, after charging the parts to be cleaned into the vessel 1 suitably by means of a basket-like insert (not shown), the level of the heat transfer fluid 2 should be slightly below the overflow 5 so that the air volume above the fluid level may be kept to a minimum.

Figure 2:
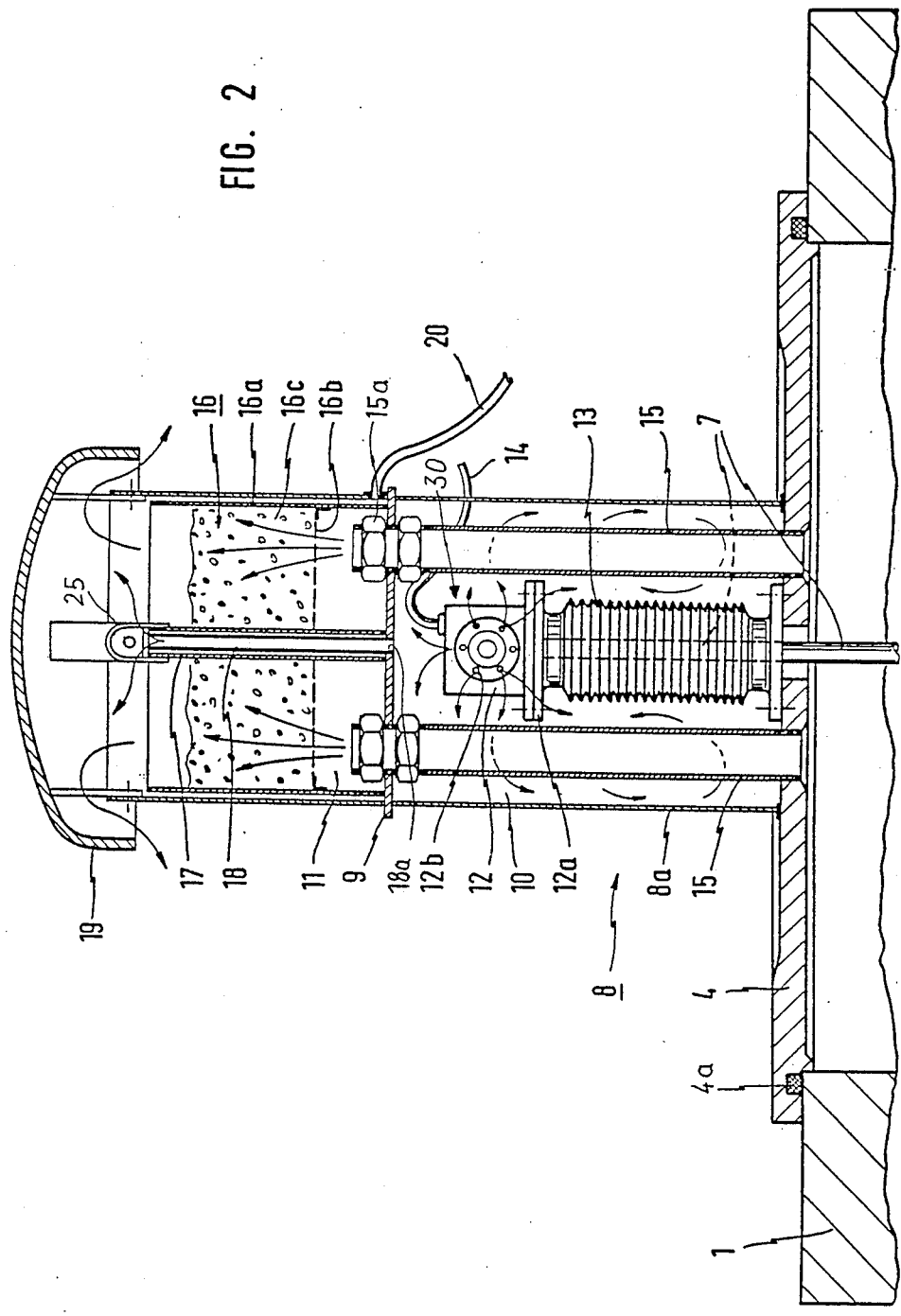
FIG. 2 is a longitudinal section on an enlarged scale of the cleaning apparatus of FIG. 1 illustrating in detail a casing box for providing a pressure relief and incorporating an oscillating unit.

Projecting through the end plate 4 and immersing into the interior of the vessel 1 is a rod 7 which is provided at its one axial end with a disk 6 and is part of an oscillating unit 30 for vibrating the disk 6 to further improve the cleaning action. The oscillating unit 30 is contained in a tubular casing box which is generally designated by reference numeral 8 and will now be described with reference to FIG. 2 illustrating a longitudinal section of the casing box 8 on an enlarged scale.

The casing box 8 includes a cylindrical housing 8a which is suitably placed on and fixed to the surface of the end plate 4. The housing 8a is divided by a partition plate 9 into a lower compartment 10, which is essentially sealed off, and into an upper compartment 11 which is open toward the atmosphere. Accommodated in the lower compartment 10 is the oscillating unit 30 which includes a compressed-air vibrator 12 with a base plate 12a to which the other axial end of the rod 7 is fixedly connected. The vibrator 12 which forms the oscillating drive for the rod 7 is supported by the end plate 4 via a bellow 13 of special steel so that the oscillations can be transmitted to the rod 7 without any impact on the end plate 9 or the vessel 1.

The compressed-air vibrator 12 is of a conventional type and is supplied via a tube 14 with compressed air driving an eccentric and rotating roller or the like arranged in the interior of the vibrator 12 and generating the oscillations by means of its out-of-balance. As indicated by the arrows, the compressed air escapes through bores 12b into the lower compartment 10.

Traversing the lower compartment 10 are a pair of spaced parallel pipes 15. Each pipe 15 is suitably fixed with its upper axial end to the partition plate 9 by means of a pair of nuts 15a while its lower axial end projects through the end plate 4 so as to allow a communication between the interior of the vessel 1 with the upper compartment 11. Thus, vapor and gases obtained during cleaning of the parts in the vessel 1 can escape through the pipes 15 into the upper compartment 10 and are cooled while flowing through the lower compartment 10 by means of the compressed air discharged by the vibrator 12. The vapor or gases essentially condense and portions thereof return through the pipes 15 back into the interior of the vessel 1. The remaining liquid droplets, vapor and residual gases are absorbed by a filter unit 16 which is suitably disposed within the upper compartment 11.

The filter unit 16 includes a filter basket 16a which is removably insertable in the upper compartment 11 and has a porous gas-permeable bottom slab 16b and a packing 16c of activated carbon. Projecting centrally through the filter unit 16 is a pipe 17 which is suitably supported by the partition plate 9 and encloses a coaxial exhaust air pipe 18 which traverses the partition plate 9 so as to define an exhaust air port 18a in communication with the lower compartment 10.

Arranged at the upper axial end of the pipe 17 and the exhaust pipe 18 is a deflector 25 which allows the exhaust air escaping unimpeded from the lower compartment 10 through the port 18a and pipe 18 to be routed to the outside. The upper end of the cylindrical housing 8a is covered by an umbrella-like cap 19.

As already mentioned, vapor or gases can escape through the pipes 15 and condense so that condensed fluid may accumulate at the bottom of the upper compartment. To allow discharge of such fluid, a drain tube 20 is connected to the upper compartment 11 at a suitable location thereof and is in communication with a collecting receptacle 21 which is laterally attached to the vessel 1 as shown in FIG. 1. Since the receptacle 21 may considerably heat up during operation, the receptacle 21 is enclosed by a protective grid 22 which is suitably fixed to the vessel 1 as indicated in FIG. 1 by way of a broken line.

Accommodated within the receptacle 21 is a second smaller tank 23 the upper end of which is open. The drain pipe 5 which limits the fluid level of the heat transfer fluid 2 within the vessel 1 is guided into the receptacle 21 and projects into the tank 23 for discharging overflowing heat transfer fluid 2 therein for cooling thereof. The tank 23 is thus also filled to a certain degree with heat transfer fluid 2.

For safety reasons, the collecting receptacle 21 is provided with a level limit indicator 24 of the float switch type for indicating the critical level of the fluid. The tank 23 is suitably provided with a drain valve 24 while the receptacle 22 is provided with a drain valve 25 so that the tank 23 and the receptacle 22 can be emptied if desired.

While the invention has been illustrated and described as embodied in an Apparatus for Removing Residues from Parts of Plastics Processing Machines, it is not intended to be limited to the details shown since various modifications and structural changes may be made without departing in any way from the spirit of the present invention.

What is claimed as new and desired to be protected by Letters Patent is set forth in the appended claims:

1. Apparatus for removing residues, especially plastic residues from parts of processing machines,; comprising:
    a vessel closable in airtight manner and having an interior containing a heat transfer fluid in which the parts are introduced;
    heating means for raising the temperature of said heat transfer fluid above a melting temperature of the residues to thereby remove the residues from the parts;
    relief means cooperating with said vessel for allowing a pressure relief in the interior of said vessel, said relief means including a housing divided in an essentially closed lower compartment and an upper compartment open toward the outside, and at least one pipe connecting the interior of said vessel with said upper compartment;
    filter means arranged in said upper compartment for absorbing substances escaping through said pipe into said upper compartment; and
    oscillating means accommodated in said lower compartment for oscillating said heat transfer fluid.

2. Apparatus as defined in claim 1 wherein said oscillating means includes a vibrator and a disk immersing in said heat transfer fluid, said vibrator being driven by compressed air and operatively connected with said disk for oscillating the latter.

3. Apparatus as defined in claim 2 wherein said vibrator is provided with open exhaust to discharge exhaust air which flows over said pipe to cool substances escaping therethrough.

4. Apparatus as defined in claim 1 wherein said housing includes a partition plate separating said upper compartment from said lower compartment.

5. Apparatus as defined in claim 4 wherein said pipe extends between said vessel and said partition plate.

6. Apparatus as defined in claim 4 wherein said partition plate is provided with an exhaust air port; and further comprising an exhaust pipe connected to said exhaust air port and traversing said filter means.

7. Apparatus as defined in claim 1, and further comprising an end cover closing said vessel in airtight manner.

8. Apparatus as defined in claim 1 wherein said housing is of tubular shape.

9. Apparatus as defined in claim 1 wherein said filter means includes a replacable filter basket arranged in said upper compartment, said filter basket having a porous gas-permeable bottom slab and a packing of activated carbon.

10. Apparatus as defined in claim 1, and further comprising draining means for discharging fluid from said upper compartment, said draining means including a collecting receptacle and a drain tube entering said upper compartment at its bottom area and extending to said collecting receptacle.

11. Apparatus as defined in claim 10, and further comprising overflow means for restricting the level of said heat transfer fluid within said vessel, said overflow means including a overflow pipe communicating with said vessel at a height corresponding to a maximum filling level, and an open smaller tank filled with heat transfer fluid and enclosed by said collecting receptacle, said tank being connected with the interior of said vessel by said overflow pipe.

12. Apparatus as defined in claim 10, and further comprising a level limit indicator provided in said collecting receptacle and at least one drain valve cooperating with said collecting receptacle.

13. Apparatus as defined in claim 12 wherein said level limit indicator is of the float switch type.

* * * * *